Jan. 19, 1932.  E. R. LLEWELLYN  1,842,035
TAILSTOCK
Filed April 29, 1930   2 Sheets-Sheet 2

INVENTOR
Ernest R. Llewellyn

Patented Jan. 19, 1932

1,842,035

UNITED STATES PATENT OFFICE

ERNEST R. LLEWELLYN, OF ARLINGTON, MASSACHUSETTS, ASSIGNOR TO THE HENDEY MACHINE COMPANY, OF TORRINGTON, CONNECTICUT, A CORPORATION OF CONNECTICUT

TAILSTOCK

Application filed April 29, 1930. Serial No. 448,412.

This invention relates to machines of the type wherein the work is supported between centers, one of said centers being supported in a member movably mounted on a bed or table.

Heretofore it has been common practice to have the work center of the movable member held stationary with the work revolving around the center as is best illustrated by a lathe tailstock.

In heavy duty machines of the lathe character wherein improved cutting tools permit a greater depth of cut and at a faster rate of speed, difficulty has been experienced in maintaining a stationary center in proper condition, the excessive pressure of the heavy cut causing undue wear of the stationary center.

There are many operations performed on a lathe wherein it is desirable to have a stationary tailstock center retaining member thus permitting the inserting of, for example, the shank of a drill. In lathe tailstocks it is desirable to obtain a maximum axial travel of the center, thus permitting the tailstock frame to remain in a fixed position for a variance in the length of work to be supported between the centers. This axial adjustment also permits the feeding of a drill, held in place of the work center, into the work. The drill must be held stationary and the work supported on a face plate revolved by the lathe headstock. This is common in machine shop practice as it permits certain turning operations and a boring operation at one set-up thus facilitating operations and reducing costs.

The object of my present invention is to provide a universal tailstock having a rotatable work center receiving member that will eliminate the disadvantages of a stationary work center and which, when desired, may be converted into a stationary receiving member by means of a locking device for the receiving member.

Another object in my present invention is the arrangement of parts completely within an axially movable sleeve which permits the entire sleeve to be withdrawn into and supported in the housing of the main frame which permits greater rigidity under excessive pressures of the cutting tool.

With the above and other objects in view my invention consists in a novel combination and arrangement of parts hereinafter described and more specifically pointed out in the appended claims.

In the accompanying drawings I have shown my invention sufficient to enable those skilled in the art to understand the construction and operation thereof.

Referring to the drawings.

Figure 1:
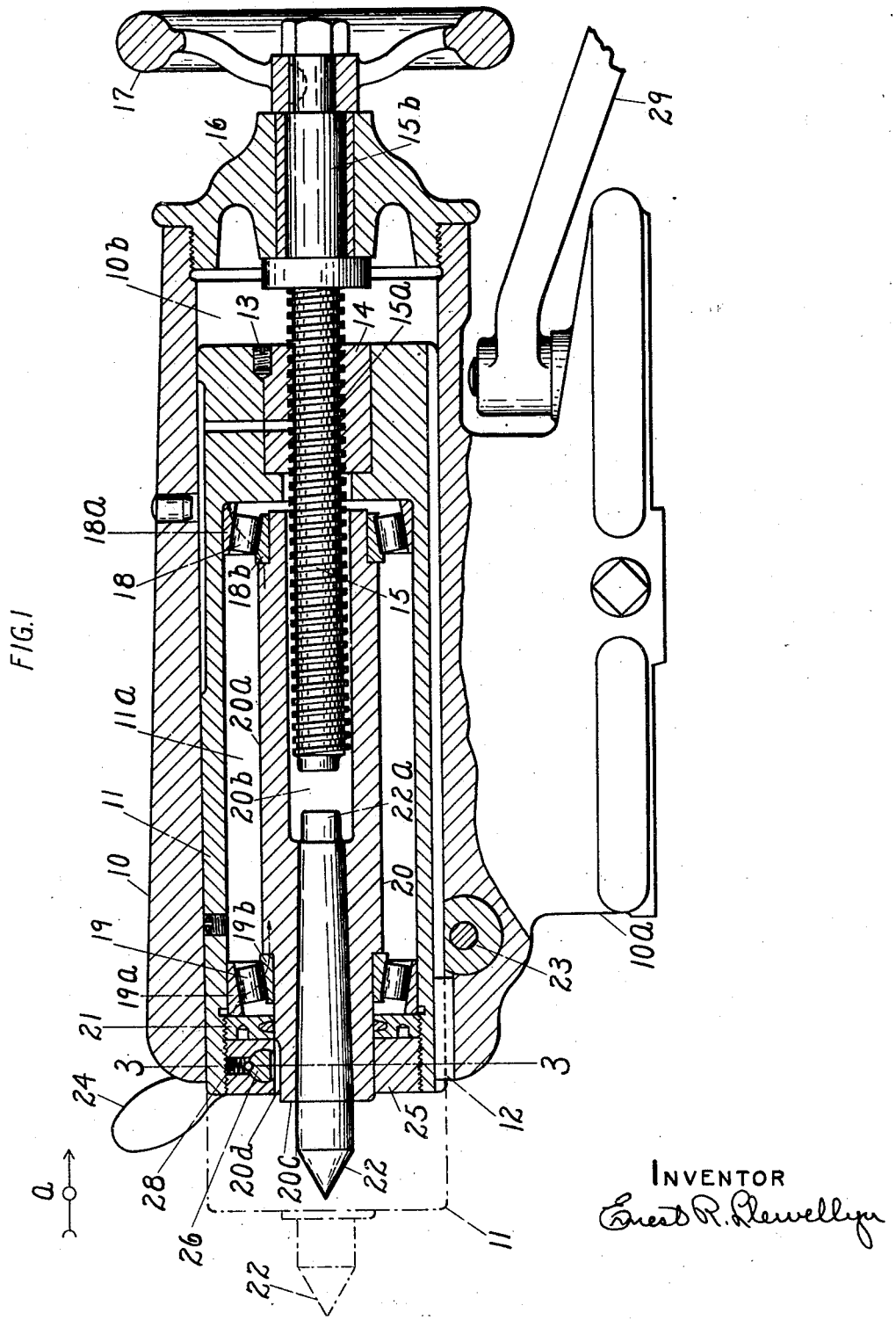
Fig. 1 is a sectional side elevation of a lathe tailstock having my invention embodied therewith.

In the drawings 10 indicates a tailstock frame of the usual construction and provided with a base 10a whereby it may be movably secured to a lathe bed. The frame is provided with a housing having a longitudinal bore 10b in which is slidably mounted a sleeve 11. Rotary motion of the sleeve is prevented by means of a key 12. The inner end of the sleeve is provided with a recessed portion adapted to have secured therein by means of a screw 13, an internally threaded nut 14. The nut 14 engages with the externally threaded portion 15a of the shaft 15 having a journal 15b rotatably mounted in the housing end cap 16. Secured on the outer end of the shaft 15 is a hand wheel 17. As the shaft 15 is revolved, the threaded portion 15a engaging with the nut 14 causes the sleeve 11 to be extended, as shown by broken lines, Fig. 1, or withdrawn relative to the housing 10.

Figure 2:
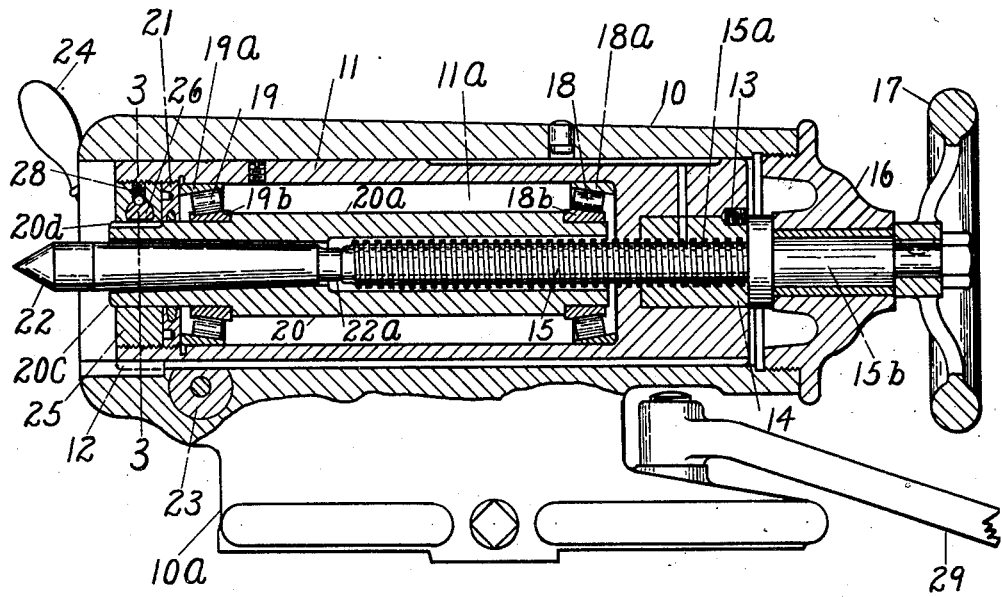
Fig. 2 is a view corresponding to Fig. 1, but shows some of the parts in a different position.

The sleeve 11 is provided with a chamber 11a adapted to receive the outer cones 18a and 19a of oppositely disposed radial thrust bearings 18 and 19 which have mounted therein the center receiving spindle 20. The center receiving spindle is provided with an enlarged portion 20a which forms abutting shoulders for the inner cones 18b and 19b of the bearings 18 and 19. The front end of the sleeve 11 is provided with an internally threaded portion adapted to receive the adjusting nut 21 which bears against the outer cone 19a. Tightening of the nut 21 will exert pressure thru the elements, as indicated by broken arrows, thus eliminating any play that devolops between the bearings. The spindle 20 is adapted to have removably mounted therein the tapered shank of a work center 22. A reduced diameter projection 22a is provided, in this instance, that extends into a chamber 20b of the center receiving spindle 20. The shaft 15 also extends into this chamber 20b and as the sleeve 11 is withdrawn to its full extent into the housing 10, the end 22a of the center is engaged thus forcing the center from its bearing in the spindle 20, see Fig. 2.

The center receiving spindle 20 is adapted to receive a drill shank or the shank of the various types of centers.

The usual locking device 23 operated by a lever 24 is provided for securing the sleeve 11 in any desired extended position.

Figure 3:
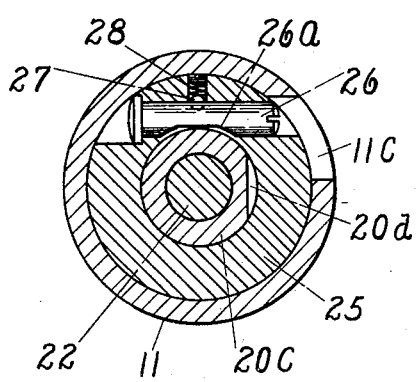
Fig. 3 is a sectional view taken substantially along line 3—3, Fig. 1, viewing in direction of arrow $a$, same figure.
Figure 4:
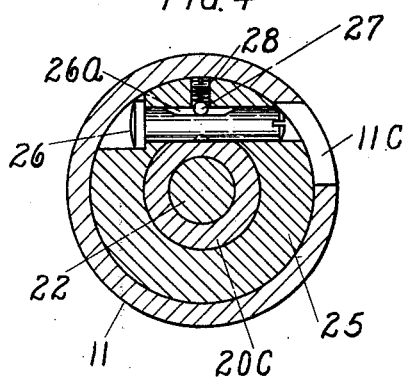
Fig. 4 is a view corresponding to Fig. 3, but shows the parts in a locked position.

In the front end of the sleeve 11 is a locking device for the center receiving spindle 20 which comprises an externally threaded nut 25 which engages with the internally threaded portion of the sleeve 11. The nut 25 is provided with a bore thru which the outer end 20c of the spindle projects. This outer end is provided with a flat surface 20d which, when it is desired to lock the center receiving spindle against rotation, is engaged by a stud 26 contained within the nut 25, see Fig. 4. The stud 26 is provided with a cut-out section 26a which permits the spindle 20 to revolve freely when said stud 26 is in its inoperative position, as shown at Fig. 3. A lock ball 27, forced inwardly by a compression spring 28, engages with an indent in the stud 26 thus retaining the stud in its inoperative position.

An opening 11c is provided in the sleeve thru which the operator inserts a screw driver to turn the stud 26 from one position to another.

The tailstock frame is also provided with a lever 29 which operates the clamping device, not shown, that secures the frame to the bed in the usual and well known way.

Having thus described my invention it will be evident that many changes and modifications may be made therein by those skilled in the art without departing from the spirit and scope thereof, therefore I do not wish to be limited to the specific details herein disclosed but what I claim is:—

1. A tailstock comprising a frame, a sleeve slidable axially therein, a spindle within said sleeve, a tool shank supported in said spindle, oppositely disposed anti-friction bearings interposed between said sleeve and said spindle, means contained within said sleeve for locking said spindle against rotation, and means for axially extending and withdrawing said sleeve relative to said frame.

2. A tailstock comprising a frame, means for securing said frame in a predetermined position, a sleeve slidable axially in said frame, a spindle within said sleeve, a tool shank supported in said spindle, oppositely disposed anti-friction bearings interposed between said sleeve and said spindle, means contained within said sleeve for locking said spindle against rotation, and means for axially extending and withdrawing said sleeve relative to said frame.

3. A tailstock comprising a frame, means for securing said frame in a predetermined position, a sleeve slidable axially in said frame, a spindle within said sleeve, a tool shank supported in said spindle, oppositely disposed anti-friction bearings interposed between said sleeve and said spindle, means contained within said sleeve for locking said spindle against rotation, means for axially extending and withdrawing said sleeve relative to said frame, and means for locking said sleeve in a desired position relative to said frame.

In testimony whereof I have hereunto set my hand.

ERNEST R. LLEWELLYN.